(12) United States Patent
Lindahl (10) Patent No.: US 11,736,862 B1
(45) Date of Patent: *Aug. 22, 2023

(54) AUDIO SYSTEM AND METHOD OF AUGMENTING SPATIAL AUDIO RENDITION

(71) Applicant: Apple Inc., Cupertino, CA (US)

(72) Inventor: Aram M. Lindahl, Menlo Park, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/407,069

(22) Filed: Aug. 19, 2021

Related U.S. Application Data (63) Continuation of application No. 16/560,536, filed on Sep. 4, 2019, now Pat. No. 11,102,578.

(60) Provisional application No. 62/737,658, filed on Sep. 27, 2018.

(51) Int. Cl.
| | |
|---|---|
| H04R 3/12 | (2006.01) |
| H04R 5/04 | (2006.01) |
| H04R 5/033 | (2006.01) |
| H04R 5/02 | (2006.01) |
| G06F 3/04817 | (2022.01) |
| G06T 13/00 | (2011.01) |
| H04S 1/00 | (2006.01) |
| G06F 3/0482 | (2013.01) |
| H04S 7/00 | (2006.01) |

(52) U.S. Cl.
CPC ............. *H04R 3/12* (2013.01); *G06F 3/0482* (2013.01); *G06F 3/04817* (2013.01); *G06T 13/00* (2013.01); *H04R 5/02* (2013.01); *H04R 5/033* (2013.01); *H04R 5/04* (2013.01); *H04S 1/002* (2013.01); *H04S 7/304* (2013.01); *H04S 2420/01* (2013.01)

(58) Field of Classification Search
CPC . H04R 3/12; H04R 5/02; H04R 5/033; H04R 5/04; G06F 3/04817; G06F 3/0482; G06T 13/00; H04S 1/002; H04S 7/304; H04S 2420/01
USPC ........................................................ 381/300
See application file for complete search history.

(56) References Cited

U.S. PATENT DOCUMENTS

| | | | |
|---|---|---|---|
| 9,584,653 B1* | 2/2017 | Lyren | G06F 3/04842 |
| 2016/0180845 A1* | 6/2016 | Kim | G06F 3/167 |
| | | | 348/211.2 |
| 2019/0052986 A1* | 2/2019 | Lee | H04S 5/005 |

* cited by examiner

*Primary Examiner* — Carolyn R Edwards
*Assistant Examiner* — Friedrich Fahnert
(74) *Attorney, Agent, or Firm* — Aikin & Gallant, LLP (57) ABSTRACT

An audio system and method of using the audio system to augment spatial audio rendition is described. The audio system can include a device to receive user inputs designating positions on an augmented reality view of a listening environment. Sound source icons can be presented in the augmented reality view at the designated positions. The sound source icons can visually represent sound sources at locations in the listening environment that correspond to, but are different than, the positions. One or more processors of the audio system can apply head-related transfer functions, which correspond to the locations in the listening environment, to audio input signals to generate binaural audio signals. The audio system can include a headset that uses the binaural audio signals to render spatialized audio localizing sounds to the locations in the listening environment. Other aspects are also described and claimed.

20 Claims, 4 Drawing Sheets

AUDIO SYSTEM AND METHOD OF AUGMENTING SPATIAL AUDIO RENDITION

This application is a continuation of co-pending U.S. patent application Ser. No. 16/560,536 filed on Sep. 4, 2019, which claims the benefit of priority of U.S. Provisional Patent Application No. 62/737,658, filed on Sep. 27, 2018 and incorporates herein by reference these patent applications.

BACKGROUND

Field

Aspects related to audio systems are disclosed. More particularly, aspects related to audio systems used to render spatial audio are disclosed.

Background Information

Headphones typically play music by rendering a stereo audio image that is perceived by the listener as internalized sound coming from within the listener's head. Headphones can also be used to render spatial audio to create a more natural experience, e.g., to simulate externalized sound coming from a location outside of the listener's head. An effective spatial sound reproduction is perceived just as the user would experience the sounds in the real world. Creating such a spatial sound reproduction, however, is a challenging and ongoing endeavor.

SUMMARY

The factors contributing to effective spatial audio rendition (accurate head-related transfer functions (HRTF)s, environment-related transfer functions (ERTF)s, and head tracking) are difficult to achieve and integrate, and have not been perfected. For example, personalizing HRTFs to individual listeners involves complex measurements of the interaction between multi-spectral audio and the listener anatomy, and has only been performed well under strict laboratory controls. Similarly, although good approximations of ERTFs and head tracking can be achieved using existing technologies, the approximations are imperfect and can accumulate into a total error that undermines the spatial audio illusion. More particularly, inaccuracies in one or more of the HRTFs, ERTFs, or head tracking information can cause the illusion to collapse, quite literally, such that the audio that is initially perceived as externalized sound outside of the listener's head moves inward and becomes perceived as internalized sound within the listener's head.

An audio system and methods of using the audio system to augment spatial audio rendition are described. In addition to implementing HRTF, ERTF, and head tracking algorithms to render spatial audio, the audio system provides a visual reference associated with the spatial audio. The visual reference can be a sound source icon displayed in an augmented reality view at a position corresponding to a virtual sound location in a listening environment. The visual reference augments the spatial audio rendition by causing a listener to perceive the virtual sound as coming from the location even when the listener stops looking at the augmented reality view. It is hypothesized that the visual representation of the virtual sound source, when viewed on a display of the audio system, convinces the listener's brain to reference the spatial audio to the location in the actual listening environment that corresponds to the position of the icon on the display. This psychoacoustic effect, which is predicated on viewing the visual cue (even if only temporarily) can make the spatial audio experience more durable. More particularly, the experience can last longer before the illusion collapses. The psychoacoustic effect works even when the HRTF, ERTF, and head tracking information is imperfect.

In an aspect, the audio system includes an input device configured to receive a user input designating positions on a displayed image of a listening environment, e.g., in an augmented reality view of the listening environment. In response to the user designations, a display of the audio system overlays sound source icons, which are visual representations of sound sources, on the image at the designated positions on the display. The sound sources can be virtual sound sources at locations within the actual (not the augmented reality view of) listening environment. For example, a sound source icon can be a three-dimensional visual model of a loudspeaker rendered at a right speaker location in the actual listening environment. One or more processors of the audio system can apply HRTFs to audio input signals corresponding to the virtual sound sources. For example, the processor(s) can apply an HRTF to the audio input signal for the right speaker (e.g., a right channel) to generate a binaural audio signal that represents sounds coming from the right speaker location. The audio system can render, through one or more speakers, spatialized audio using the binaural audio signal to localize sound to the locations in the actual listening environment. For example, a headset can play the binaural audio signal to create the illusion that there is a right speaker generating sounds from the right speaker location external to the user's head. The user may discontinue presentation of the image on the display, e.g., by setting the phone down, and the headset can continue rendition of the spatialized audio. Despite the lack of a continued visual aid, the user may continue to perceive the localized sounds as coming from the locations in the actual listening environment because the previously presented visual cues can calibrate the mind of the user to believe that the virtual sound sources are actually at those locations. Accordingly, the psychoacoustic effect of presenting visual cues associated with a spatial audio rendition is a more durable spatial audio experience.

The above summary does not include an exhaustive list of all aspects of the present invention. It is contemplated that the invention includes all systems and methods that can be practiced from all suitable combinations of the various aspects summarized above, as well as those disclosed in the Detailed Description below and particularly pointed out in the claims filed with the application. Such combinations have particular advantages not specifically recited in the above summary.

DETAILED DESCRIPTION

Aspects describe an audio system and method of using the audio system to augment spatial audio rendition. The audio system can include a device and a headset. In an aspect, the device can be a smartphone and the headset can be circumaural headphones. The headset can include other types of headphones, such as earbuds or supra-aural headphones, to name only a few possible applications. In other aspects, the device can be another device for rendering media including audio to a user, such as a tablet, a desktop computer, a laptop computer, an augmented reality/virtual reality headset, etc. In other aspects, the device and headset can be integrated into a single device.

In various aspects, description is made with reference to the figures. However, certain aspects may be practiced without one or more of these specific details, or in combination with other known methods and configurations. In the following description, numerous specific details are set forth, such as specific configurations, dimensions, and processes, in order to provide a thorough understanding of the aspects. In other instances, well-known processes and manufacturing techniques have not been described in particular detail in order to not unnecessarily obscure the description. Reference throughout this specification to "one aspect," "an aspect," or the like, means that a particular feature, structure, configuration, or characteristic described is included in at least one aspect. Thus, the appearance of the phrase "one aspect," "an aspect," or the like, in various places throughout this specification are not necessarily referring to the same aspect. Furthermore, the particular features, structures, configurations, or characteristics may be combined in any suitable manner in one or more aspects.

The use of relative terms throughout the description may denote a relative position or direction. For example, "in front of" may indicate a location in a first direction away from a reference point. Similarly, "behind" may indicate a location in a second direction away from the reference point and opposite to the first direction. Such terms are provided to establish relative frames of reference, however, and are not intended to limit the use or orientation of an audio system or components thereof to a specific configuration described in the various aspects below.

Several components contribute to an effective spatial sound rendition that creates the illusion of an externalized virtual sound source. First, an accurate head-related transfer function (HRTF) personalized to the listener contributes to effective spatial audio. An HRTF is a model of a filter that contains all of the acoustic information required to describe how sound reflects or diffracts around a listener's head, torso, and outer ear before entering their auditory system. The HRTF matches the reproduced audio to the user anatomy to make the audio sound as if it is actually interacting with the user anatomy along an acoustic path from the external location to an ear entrance. Second, an environment-related transfer function (ERTF) specific to a listening environment contributes to effective spatial audio. An ERTF is a model of a filter containing acoustic information required to describe how sound reflects and reverberates within the listening environment. The ERTF matches the reproduced audio to the listening environment to make the audio sound as if it is actually coming from within the listening environment. Third, head tracking of the listener's head during audio reproduction contributes to effective spatial audio. Head tracking involves tracking a position and/or orientation of the listener's head and using the tracking information to shift the virtual sound source accordingly. Shifting the virtual sound source opposite to movement of the listener's head can cause the listener to perceive virtual sound as coming from a fixed location within the listening environment as the user moves his head or body. In scenarios where personalized HRTFs and ERTFs cannot be obtained, however, a system can use other representations to provide visual cues to a user regarding the presence of virtual sound sources.

In an aspect, an audio system provides a visual reference corresponding to a virtual sound source. For example, the audio system can receive a user input on a display of a device to designate one or more positions within an augmented reality view of a listening environment. The positions can correspond to one or more sound source locations within the listening environment. A corresponding sound source icon, e.g., an image of a loudspeaker, can be displayed at the position on the display to be viewed by a listener. The audio system can reproduce a binaural audio signal, e.g., using a headset, to render spatial audio including a sound coming from the sound source location within the listening environment. The listener can listen to the spatial audio, which may be music or a movie soundtrack, even after setting down or turning off the display of the device. The experience of creating and/or viewing the sound source icon on the display before or during the spatial audio rendition can cause a durable spatial audio experience that is less likely to collapse into the head of the listener.

Figure 1:
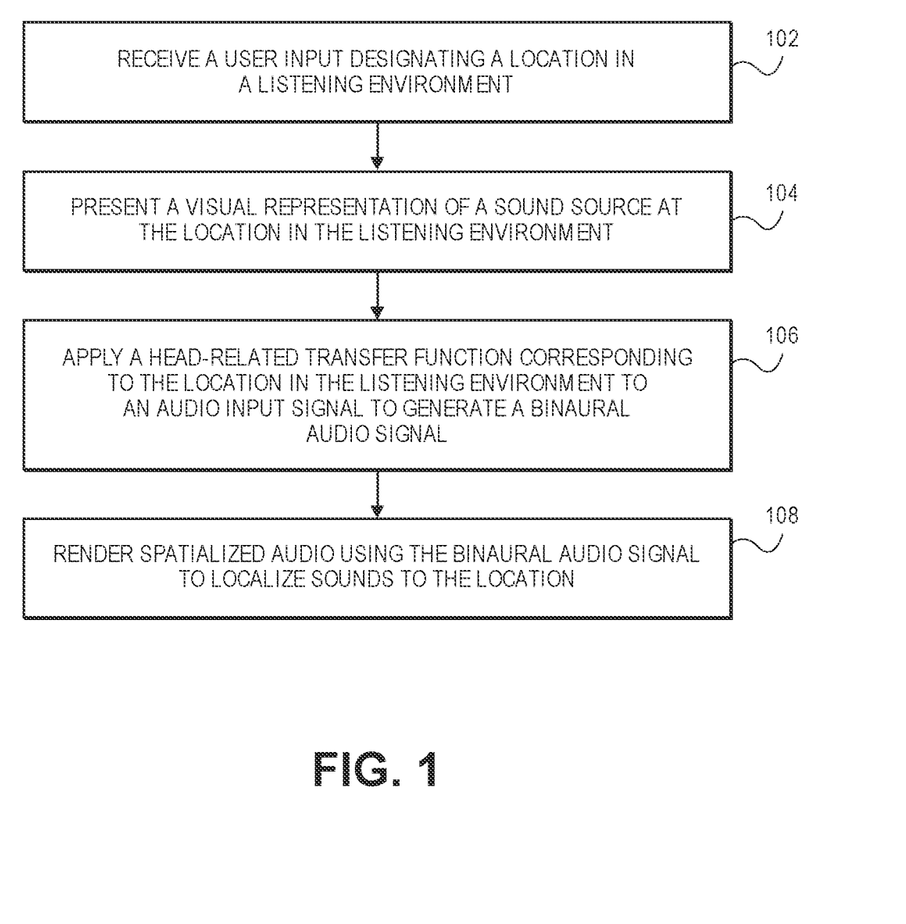
FIG. 1 is a flowchart of a method of augmenting spatial audio rendition, in accordance with an aspect.

Referring to FIG. 1, a flowchart of a method of augmenting spatial audio rendition is shown in accordance with an aspect. The operations of the method of FIG. 1 relate to aspects shown in FIGS. 2-5, and accordingly, FIGS. 1-5 are described in combination below.

Figure 2:
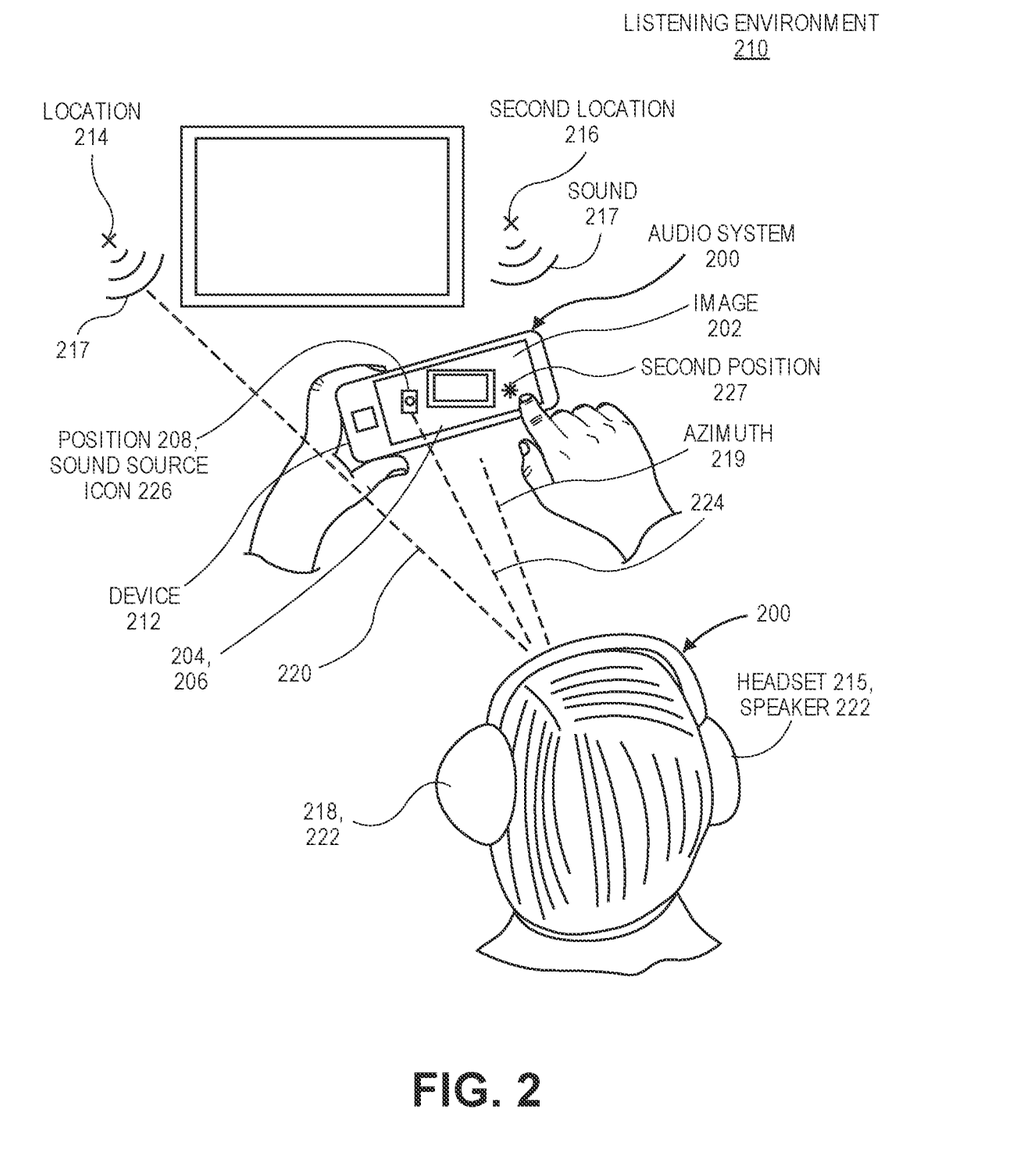
FIG. 2 is a pictorial view of a user handling an audio system, in accordance with an aspect.

Referring to FIG. 2, a pictorial view of a user handling an audio system is shown in accordance with an aspect. At operation 102, an audio system 200 receives a user input designating a location in a listening environment. For example, the user input can designate one or more positions on one or more images 202 of the listening environment 210. The user can perform a set up process to place one or more sound source icons, e.g., visual representations of speakers, at specified positions in an augmented reality view on a display 204.

In an aspect, the user can open an audio application executing on mobile device 212. The audio application can be a music application or a movie application that renders spatial audio to the user. More particularly, the spatial audio rendition can be music or a movie soundtrack. The user can perform operations within the audio application to initiate an augmented reality view.

The augmented reality view can include the presentation of one or more images 202 of listening environment 210. For example, the one or more images 202 of listening environment 210 can be frames of a video of listening environment 210. Listening environment 210 can be the actual environment in which audio system 200 is being used by the user, e.g., a car, a living room, etc. Alternatively, as described below, listening environment 210 can be a simulated space that the user wishes to emulate in the spatial audio rendition, e.g., a concert hall, a movie theater, etc. In any case, image(s) 202 of listening environment 210 can be presented to the user on display 204.

The user can view images 202 of listening environment 210 to find positions 208 in the augmented reality view where sound sources are to be placed. For example, the user can move mobile device 212 to view, in images captured by a camera of mobile device 212, a location 214 within listening environment 210. Location 214 can be, for example, a point to the left of a television display, a computer monitor, etc. Location 214 can be a place where a left speaker of a surround sound system would normally be located.

In an aspect, when location 214 is identified, the user can enter a user input to designate location 214 in the listening environment 210. The user input can designate position 208 on image 202 corresponding to location 214 in listening environment 210. An input device 206 of audio system 200 receives the user input designating position 208 on the one or more images 202 of listening environment 210. Input device 206 can be, for example, a touchscreen of a device, e.g., a mobile device 212. For example, the user input can include a tap on display 204 at position 208 to designate position 208 on image 202.

It will be appreciated that location 214 in listening environment 210 corresponds to position 208 on image 202, however, location 214 with respect to the listening environment 210 may be different than position 208 with respect to the augmented reality view of the listening environment 210. More particularly, location 214 may be at a first point in space adjacent to the television display 204 within the actual listening environment 210, and position 208 may be a second point in space on display 204 (where the user tapped display 204) adjacent to the graphical representation of television display in the augmented reality view of listening environment 210. Given that the camera of mobile device 212 may utilize a wide-angle lens, a field of view of image 202 may be different than a field of view seen by the user. Accordingly, position 208 on the one or more images (or frames of video) of the augmented reality view of listening environment 210 may have a different relative direction from the user then location 214 in listening environment 210.

Audio system 200 includes a headset 215, e.g., headphones, to be worn by the user during a spatial audio rendition. Headset 215 can be configured to render spatialized audio including sound 217 localized to location(s) in listening environment 210, as described below. In an aspect, headset 215 include a head tracking system to track a direction of headset 215 relative to an azimuth 219. Azimuth 219 can be a reference direction that is predetermined, e.g., due north, or selected during operation, e.g., as a calibration direction that is entered into audio system 200. In an aspect, a first direction 220 from the user and/or a speaker 222 of headset 215 to location 214 in a listening environment 210 can be different than a second direction 224 from the user and/or speaker 222 to position 208 on the one or more images 202 (or frames of video) of listening environment 210. Accordingly, position 208 and location 214 can have different relative directions from azimuth 219 and/or headset 215.

Additional positions for virtual sound sources can be designated by the user through interactions with input device 206. For example, the user can designate another sound source position, e.g., for a right speaker of a surround sound system. The designated position can be entered in the augmented reality view by tapping on image 202 at a second position 227 of the touchscreen. Input device 206 can receive the tap as a second user input designating second position 227 for a second sound source to be rendered within listening environment 210. Second position 227 in the augmented reality view of listening environment 210 can correspond to, but be different than, a second location 216 within the actual listening environment 210 at which the second sound source is to be located.

The user can continue to designate positions for sound sources by moving mobile device 212 to view different locations within listening environment 210 and tapping or otherwise entering a command to set the positions where sound sources are to be located. For example, if the user wishes to simulate a surround sound system having virtual sound sources at center, front, and rear locations, the user can view and tap on images 202 of the center, front, and rear locations within the augmented reality view.

At operation 104, as the location is designated by the user, a visual representation of a sound source at the location can be presented in the listening environment. For example, as positions are designated by the user, audio system 200 can present sound source icons overlaid on the one or more images 202 at the positions. A sound source icon 226 can be presented at position 208 on display 204 of audio system 200 in response to the user input designating position 208 to the left of the television screen in the augmented reality view. In an aspect, sound source icon 226 at position 208 is a visual representation of a sound source at the corresponding location 214 in the actual listening environment 210. In other words, sound source icon 226 is a visual cue to the user, which associates the location 214 (where sounds will be localized to) with a sound source (that the user will psychologically perceive as creating the localized sound). The visual cue creates a psychoacoustic effect of convincing the user that a sound source is actually generating the spatialized sound 217 even when the user has stopped viewing sound source icon 226 in the images 202 on display 204.

Figure 3:
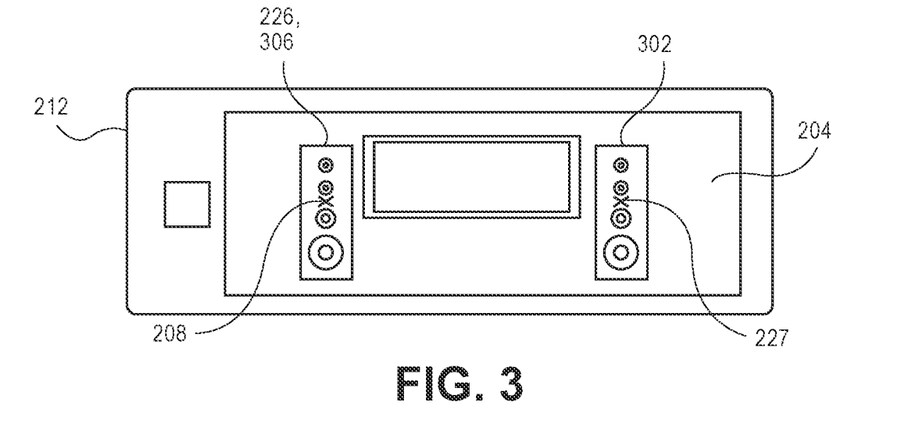
FIG. 3 is a pictorial view of a sound source icon overlaid on one or more images of an actual listening environment, in accordance with an aspect.

Referring to FIG. 3, a pictorial view of a sound source icon overlaid on one or more images of an actual listening environment is shown in accordance with an aspect. One or more sound source icons can be visible on display 204 at a time. For example, display 204 can present sound source icon 226 corresponding to location 214, and a second sound source icon 302 corresponding to second location 216. The sound source icons can be overlaid on the one or more images 202 at position 208 and a second position 227, e.g., to the left and right of the television display, within the augmented reality view. Accordingly, as the user views the sound source icons on display 204, the illusion of sound sources within the listening environment 210, which the icons visually represent, is reinforced.

Figure 4:
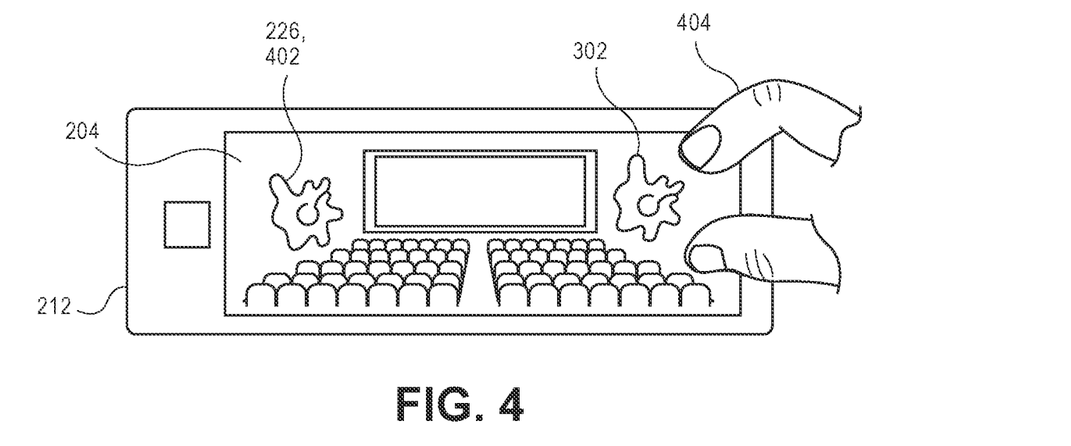
FIG. 4 is a pictorial view of a sound source icon overlaid on one or more images of a simulated listening environment, in accordance with an aspect.

In an aspect, input device 206 can receive user selections of listening environment 210 from several listening environment options. The user selections can be made as user inputs to input device 206, e.g., selecting a listening environment option from a predetermined list of options. As described above, listening environment 210 can be the actual listening environment that audio system 200 is used within. For example, listening environment 210 can be a living room where the user is currently using audio system 200. In such case, the user can enter a command within the audio application, e.g., tap on a listening environment option that is presented on display 204 and titled "Local Environment," to enter the augmented reality view in which the camera of mobile device 212 captures images 202 of the surrounding environment for presentation on display 204 (FIG. 3). Alternatively, listening environment 210 can be a simulated listening space. In such case, the user can enter a command within the audio application, e.g., tap on a listening environment option that is presented on display 204 and titled "Famous Movie Theater," to enter the augmented (or virtual) reality view in which an augmented (or virtual)

reality scene of a predetermined well-known movie theater is presented on display 204 (FIG. 4).

Audio system 200 can employ an ERTF corresponding to the selected listening environment option when rendering spatial audio. For example, in the case of the listening environment option being a listening space within which the user is presently situated, audio system 200 can use impulse response measurements based on audio signals output by a speaker of mobile device 212 and audio inputs received by a microphone of mobile device 212 to determine the acoustic characteristics of listening environment 210, e.g., reflection characteristics, reverberation characteristics, etc. In the case of the listening environment option being a predetermined listening space simulation, such acoustic characteristics can be stored in a memory of mobile device 212 as part of the simulation model (visual and acoustic information) for the selected listening scene. The acoustic information can be applied to an audio input signal when rendering spatial audio to cause the rendered audio to sound as if the virtual sound sources are playing within the selected listening environment 210.

In an aspect, input device 206 can receive user selections of sound sources from several sound source options. The user selections can be made as user inputs to input device 206, e.g., selecting a sound source option from a predetermined list of options. The selected sound source options can be customized to each designated position on display 204. For example, the user may enter a command to designate the sound source visually represented by sound source icon 226 as being a loudspeaker 306 having a predetermined acoustic performance. More particularly, loudspeaker 306 can be a high-end audio speaker of a predetermined model from a predetermined manufacturer. The acoustic performance of loudspeaker 306, e.g., the acoustic output of the combined driver and cabinet system, can be measured and a corresponding model can be stored in the memory of mobile device 212. Similarly, the user may enter a command to designate the second sound source visually represented by second sound source icon 302 as another loudspeaker of a low fidelity type. The lo-fi speaker can have a predetermined model from a predetermined manufacturer, and an acoustic model of the speaker can be stored in the memory of mobile device 212. Accordingly, audio filters for the predetermined sound sources can be applied to an audio input signal during spatial audio rendering to create the illusion that the user is listening to a particular model of speaker. Furthermore, the selected sound generating source can be visually represented by sound source icons that visually replicate the chosen loudspeaker models. More particularly, sound source icons can be three-dimensional animated renderings of the chosen loudspeakers. Accordingly, the spatial audio illusion is reinforced by visually presenting imagery of the sound source to the user.

In an aspect, the sound sources can be set as objects other than loudspeakers. For example, the user may select a musical instrument, such as a cello, from a list of sound source options when listening to a live recording of a cello performance. In another aspect, sound source icons 226, 302 can be more generic in nature. For example, sound source icon 226 can be a visual aid, including a dot, a sound meter, or any other visual cue located at position 208 corresponding to location 214 of the sound source. In any case, sound source icon 226 can visually reinforce the acoustic illusion of the sound source when spatial audio is rendered by mobile device 212.

Referring to FIG. 4, a pictorial view of a sound source icon overlaid on one or more images of a simulated listening environment is shown in accordance with an aspect. Sound source icons 226, 302 can be animated representations 402 of respective sound sources. For example, in the case where sound source icon 226 is a three-dimensional visual model of loudspeaker 306, the diaphragms of loudspeaker 306 can visibly vibrate within the augmented reality view. In an aspect, sound source icon 226 includes a dot or an orb that is animated to give a visual sense that the icon is generating sound. The graphical effects can provide realism and visual interest to entice the user to spend more time looking at the visual reference, thereby enhancing the durability of the psychoacoustic effect.

In an aspect, animated representation 402 of the sound source can include an animation parameter corresponding to a sound parameter of an audio input signal. More particularly, headset 215 can generate sound 217 based on the audio input signal, which includes sound parameters such as level, tone, etc. Similarly, animated representation 402 can have animation parameters, such as a color of the sound source icon, a dimension of the sound source icon, or other characteristics that define the icon. The animation parameter may be proportional to the sound parameter. For example, sound source icon 226 can be a pulsing orb having an aura that visibly changes color or moves in time with music coming from location 214. In such case, a diameter of the aura can increase as a level of sound 217 increases, and vice versa. By moving in sync with sound 217, sound source icon 226 is a visual tie-in to help the user believe that sound 217 is coming from the external location 214.

Figure 5:
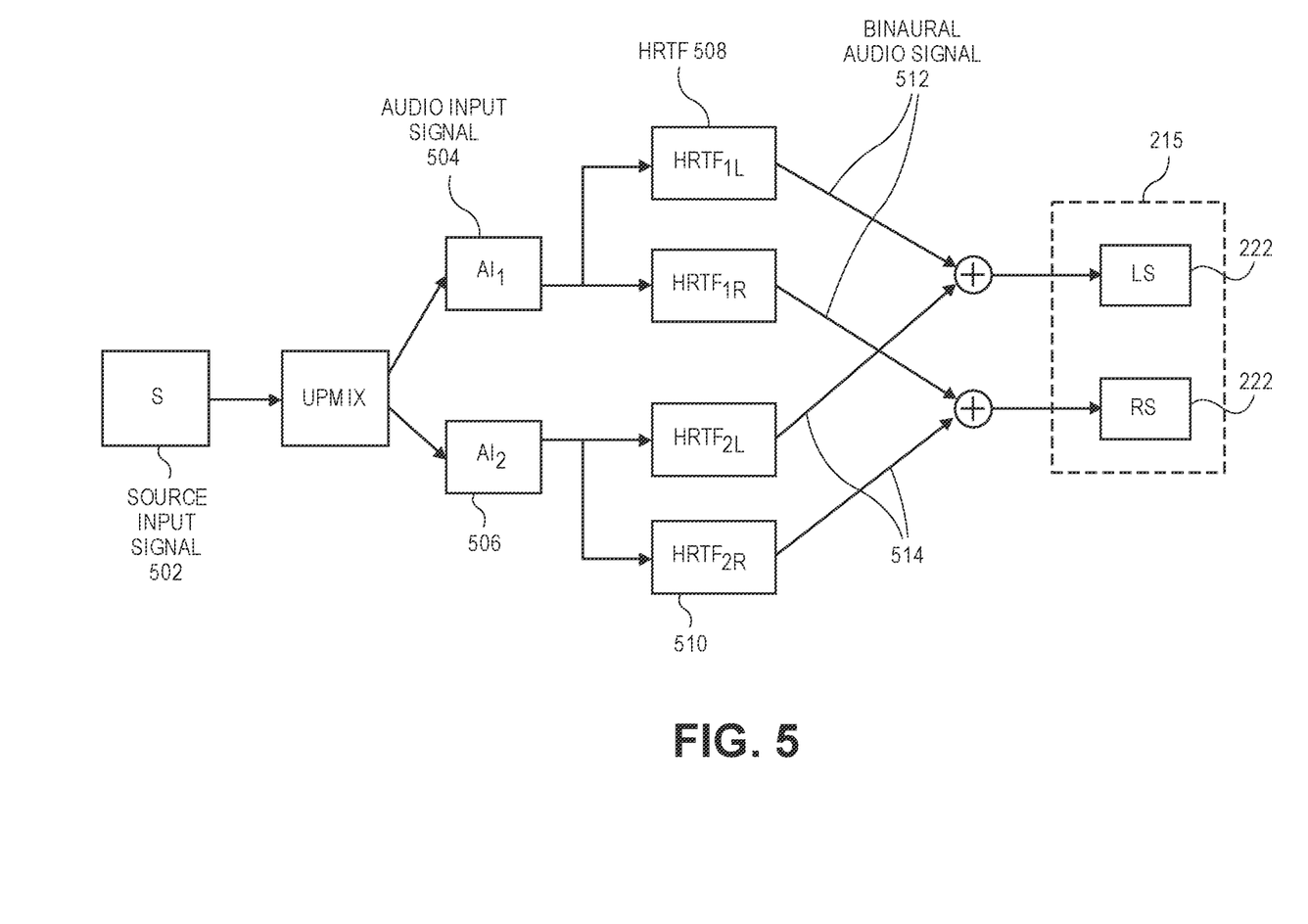
FIG. 5 is a schematic view of spatial audio processing by an audio system, in accordance with an aspect.

Referring to FIG. 5, a schematic view of spatial audio processing by an audio system is shown in accordance with an aspect. A component of audio system 200, e.g., one or more of device or headset 215, can include one or more processors to execute instructions to carry out the different functions and capabilities described herein. Instructions executed by the processor(s) may be retrieved from a memory, e.g., in device 212 and/or headset 215, which may include a non-transitory machine readable medium. The instructions may be in the form of an operating system program having device drivers and/or an audio rendering engine for rendering music playback, binaural audio playback, etc., according to the methods described herein. The processor(s) can retrieve data from the memory for various uses. For example, the processor(s) can retrieve data to render spatial audio corresponding to a source input signal 502, e.g., audio data corresponding to music, a movie soundtrack, or another audio signal stored in the memory.

The user may wish to experience the sounds encoded within source input signal 502 as if the sounds are generated at the various locations within listening environment 210 as defined through the audio application. For example, the user may have designated sound source icons to visually represent a surround sound system within a living room. Source input signal 502, however, may be a mono signal or a stereo signal, and thus, may have fewer channels than the number of sound sources that are being simulated within listening environment 210. For example, the user may have designated two sound sources to be localized to location 214 and second location 216. Source input signal 502 may, however, have only a single channel. In an aspect, one or more processors of audio system 200 can upmix source input signal 502 to generate audio input signals corresponding to each the sound source. For example, source input signal 502 can be upmixed to an audio input signal 504 corresponding to the sound source at location 214 and a second audio input signal 506 corresponding to the sound source at second location 216. More particularly, source input signal 502 can be upmixed to a number of channels equal to the number of sound source icons placed at respective positions 208 in the displayed augmented reality listening environment.

At operation 106, one or more processors of audio system 200 can apply head-related transfer functions (HRTFs) to the generated audio input signals. The HRTFs can correspond to the locations within listening environment 210 at which the sound sources for the audio input signals are set. For example, audio system 200 can apply a first HRTF 508 to audio input signal 504 corresponding to the sound source at location 214, and a second HRTF 510 to second audio input signal 506 corresponding to the second sound source at second location 216. Each HRTF 508/510 can include information for a different speaker 222 of headset 215. For example, HRTF 508 can have left speaker information (left channel information) and right speaker information (right channel information), and HRTF 510 can have left speaker information (left channel information) and right speaker information (right channel information). Accordingly, application of the HRTFs to the respective audio input signals can generate a respective binaural audio signal for each sound source. More particularly, the one or more processors can generate a binaural audio signal 512 corresponding to the sound source at location 214, and a second binaural audio signal 514 corresponding to the sound source at second location 216.

At operation 108, audio system 200 renders spatialized audio using the binaural audio signals to localize sounds to the respective locations within listening environment 210. For example, one or more speakers 222 of headset 215, e.g., a left speaker and a right speaker, can receive the binaural audio signals for playback. All of the generated binaural audio signals can be combined by the one or more processors of audio system 200. The combined binaural audio signal can have a left channel for playback by the left speaker 222 of headset 215 and a right channel for playback by the right speaker 222 of headset 215. Playback of the combined binaural audio signal by headset 215 can generate spatialized audio including sounds localized to the locations within the spatial audio soundscape. For example, playback can include playback of binaural audio signal 512 to localize sound 217 to location 214, and playback of second binaural audio signal 514 to localize sound 217 to second location 216. Accordingly, audio system 200 can render a spatial audio soundscape around the user with sounds coming from locations that correspond to sound source icons shown at various positions on display 204.

The audio application executing on audio system 200 may allow for additional controls and visual cues that enforce the spatial audio illusion. In an aspect, the user can interact with the audio application to place one or more control icons within the augmented reality view. For example, input device 206 can receive user selections of audio mixing controls from a predetermined list, and one or more user inputs designating positions on display 204 where the mixing controls can be placed. For example, the user can place a virtual knob on images of a desk in front of the user. In response to the user selection and designation, audio system 200 may present an augmented reality control panel on the surface for the user to view and control. More particularly, the user can press, turn, slide, or otherwise interact with the controls on the touchscreen to cause corresponding adjustments to the audio input signals. By way of example, the user can turn a virtual knob on display 204 to adjust a bass level of a sound source generating sound 217 at location 214. The combination of visual cues representing the sound sources and the ability to virtually control the sounds coming from the sound sources can further enhance the spatial audio illusion and make the illusion more durable.

In an aspect, rendered sounds come from the locations within the actual listening environment 210 where the sound sources are set. As described above, the locations may be at different relative directions from the user (or headset 215) than the positions of the corresponding sound source icons on display 204. It will be appreciated that this difference in relative direction may contrast with, for example, a virtual reality environment in which sounds are rendered to come from the exact position on the virtual reality display that is being viewed by the user. Similarly, this contrasts with a system that renders sounds as coming from animated characters displayed on a screen. More particularly, the icons presented on display 204 act as visual representations of sound sources located at other locations (at different distances or angles from the user than the icons) to reinforce the perception that sounds are coming from another location, rather than being animations that are the sound sources in the illusion.

As a function of the above-noted contrast, the user may stop viewing the simulated listening environment on display 204, and the spatial audio may continue to be perceived as including sounds externalized to the locations in the actual listening environment 210. For example, the user may set down mobile device 212, place display 204 in a sleep mode, etc., after the spatial audio rendition begins. While the spatial audio rendition continues, the user may therefore not be viewing the sound source icons. More particularly, the speaker(s) 222 of headset 215 can continue rendition of the spatialized audio after display 204 discontinues presentation of the one or more images 202. Despite the lack of a visual representation of the sound source, the user may continue to perceive the spatialized sounds 217 as coming from the locations within listening environment 210. The illusion can continue for a prolonged period of time even when the HRTF, ERTF, or head tracking used for audio rendering is imperfect. That is, the illusion may not collapse after the user stops viewing the visual cues. It will be appreciated that this psychoacoustic effect—a continued spatial audio experience and/or a more durable spatial audio experience—can contrast with the effect of discontinuing display of animations within a virtual reality environment. In the virtual reality environment, if the user stops viewing the virtual reality display, the virtual audio illusion may collapse immediately or quickly into a non-spatial internalized audio experience.

In an aspect, the audio system 200 can be a head-mounted display (HMD). The HMD can integrate both the device 212 and the headset 215 into a single device. The HMD can be a display device that incorporates the display 204 used to present the visual representation of the sound source at the location, and the headset 215 used to render spatialized audio to localize sounds to the locations. The HMD can be worn on a head of the user to allow the user to see images presented on the display 204 and hear sounds played by the headset 215.

Display 204 of an HMD can be an opaque display or a transparent display. An opaque display can be a miniaturized display, e.g., a liquid-crystal display or an organic light-emitting diode display, that displays images captured by a camera. The opaque display may not allow a user to view the real world directly through the display. By contrast, a transparent display, also known as an optical head-mounted display, can display both computer-generated imagery and real world imagery. The computer-generated imagery can be projected onto transparent lenses and superimposed on the real world imagery that is viewable by the user through the transparent lenses of the display.

When audio system 200 includes an HMD, user inputs, e.g., to designate the location in the listening environment, may be made in various manners. More particularly, the HMD may be connected to a controller, or may include a controller, that serves the function of the input device of the device 212. The input device can have input features to allow the user to select positions within a displayed image to represent the locations in the listening environment. For example, the controller can be a joystick-type device having buttons to receive the user inputs. Alternatively, the controller can be a mobile device having a touchpad to the receive the user inputs. Inputs may also be detected through speech recognition, gesture recognition, eye tracking, etc., as will be appreciated by one skilled in the art. Accordingly, the user can select the positions for the sound source icons using the controller of the HMD audio system.

As described above, visual representations, e.g., sound source icons, can be displayed on the HMD at the selected positions to represent sound sources at the locations within the listening environment. HRTFs can be applied to audio input signals as described above, and spatialized audio can be rendered to the user through speakers of the HMD to localize sounds to the locations. Accordingly, although the audio system 200 has been primarily described in relation to a system including a device 212 and a headset 215, one skilled in the art will understand that the audio system 200 and its functionality may be embodied in an HMD.

In an aspect, the user can enter commands to move or remove sound source icons after the icons are initially placed. For example, the user can drag and drop the sound source icons to different positions within the simulated listening environment, and corresponding adjustments to the spatial audio can be made to render sounds from a correspondingly moved location within the actual listening environment 210. The audio application can also allow the user to remove sound source icons to discontinue spatial audio playback of sounds from corresponding locations. For example, referring to FIG. 4, input device 206 can receive a user interaction 404 with one or more sound source icons to remove the sounds 217 sources from the spatial soundscape. In an aspect, user interaction 404 can be a pinching gesture or another suitable gesture (e.g., a swipe across the position of an icon). More particularly, the user can perform a pinching gesture on the touchscreen over the second position 227 of second sound source icon 302, and in response to the user input, the icon can be removed from the display and the one or more processors can make appropriate adjustments to the spatial audio rendition. For example, the one or more processors can downmix source input signal 502 to maintain parity between the number of binaural audio signals combined for playback by headset 215 and the number of sound source icons in the simulated listening environment. Accordingly, removal of the sound source icon can discontinue, in response to user interaction 404, rendition of spatialized audio from the corresponding sound source.

To aid the Patent Office and any readers of any patent issued on this application in interpreting the claims appended hereto, applicants wish to note that they do not intend any of the appended claims or claim elements to invoke 35 U.S.C. 112(f) unless the words "means for" or "step for" are explicitly used in the particular claim.

In the foregoing specification, the invention has been described with reference to specific exemplary aspects thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A method of augmenting spatial audio output, comprising:
receiving, by an input device, a user input designating a plurality of locations in a listening environment;
presenting, by a display in response to the user input, a three-dimensional visual representation of a plurality of audio sources overlaid on a view of the listening environment at the plurality of locations;
applying, by one or more processors, respective head-related transfer functions (HRTFs) to respective audio input signals to generate respective binaural audio signals for each of the plurality of audio sources, wherein the respective audio input signals include different channels of a source input signal;
outputting, by one or more speakers, spatialized audio using the respective binaural audio signals, wherein the spatialized audio includes sounds localized to the plurality of locations designated in the listening environment; and
continuing, by the one or more speakers, output of the spatialized audio after the display discontinues presentation of the visual representation of the plurality of audio sources.

2. The method of claim 1, wherein the respective HRTFs are for the plurality of locations designated by the user input.

3. The method of claim 1, wherein the view of the listening environment comprises one or more images of the listening environment.

4. The method of claim 3, wherein the one or more images are frames of a video of the listening environment, and wherein a plurality of positions on the frames of the video corresponding to the user input has a different relative direction from the one or more speakers than the plurality of locations designated in the listening environment.

5. The method of claim 1, wherein the user input includes a plurality of taps on the display at a plurality of positions designated on one or more images of the listening environment.

6. The method of claim 1 further comprising receiving, by the input device, a user selection of the listening environment from a plurality of listening environment options.

7. The method of claim 1 further comprising receiving, by the input device, a user selection of the plurality of audio sources from a plurality of sound source options.

8. The method of claim 1, wherein the three-dimensional visual representation of the plurality of audio sources include a plurality of sound source icons overlaid on the view of the listening environment at the plurality of locations.

9. The method of claim 8, wherein the plurality of sound source icons are animated representations of the plurality of audio sources, and wherein the animated representations include animation parameters corresponding to sound parameters of the audio input signals.

10. The method of claim 1, wherein the plurality of audio sources have predetermined acoustic performances.

11. The method of claim 1 further comprising upmixing, by the one or more processors, the source input signal to generate the respective audio input signals.

12. The method of claim 1 further comprising:
receiving, by the input device, a user interaction with the three-dimensional visual representation of the plurality of audio sources; and
discontinuing, in response to the user interaction, output of the spatialized audio.

13. An audio system, comprising:
a device including
an input device configured to receive a user input designating a plurality of locations in a listening environment,
a display configured to present, in response to the user input, a plurality of sound source icons overlaid on a view of the listening environment at the plurality of locations, wherein the plurality of sound source icons are three-dimensional visual representations of a plurality of audio sources, and
one or more processors configured to apply respective head-related transfer functions (HRTFs) to respective audio input signals to generate respective binaural audio signals for each of the plurality of audio sources, wherein the respective audio input signals include different channels of a source input signal; and
an audio output device configured to output spatialized audio using the respective binaural audio signals, wherein the spatialized audio includes sounds localized to the plurality of locations designated in the listening environment, and wherein the audio output device is configured to continue output of the spatialized audio after the display discontinues presentation of the visual representation of the plurality of audio sources.

14. The audio system of claim 13, wherein the view of the listening environment comprises frames of a video of the listening environment in which the audio system is being used, wherein the audio output device includes a head tracking system to track a direction of the audio output device relative to an azimuth, and wherein a position on the frames of the video corresponding to the user input has a different relative direction from the azimuth than the plurality of locations designated in the listening environment.

15. The audio system of claim 13, wherein the plurality of sound source icons are animated representations of the audio source, and wherein the animated representations include animation parameters corresponding to sound parameters of the audio input signals.

16. The audio system of claim 13, wherein the plurality of audio sources have predetermined acoustic performances.

17. A non-transitory machine readable medium storing instructions executable by one or more processors of an audio system to cause the audio system to perform a method comprising:
receiving, by an input device of an audio system, a user input designating a plurality of locations in a listening environment;
presenting, by a display of the audio system in response to the user input, a plurality of sound source icons overlaid on a view of the listening environment at the designated plurality of locations, wherein the plurality of sound source icons are three-dimensional visual representations of a plurality of audio sources;
applying, by one or more processors of the audio system, respective head-related transfer functions (HRTFs) to respective audio input signals to generate respective binaural audio signals for each of the plurality of audio sources, wherein the respective audio input signals include different channels of a source input signal;
outputting, by one or more speakers of the audio system, spatialized audio using the respective binaural audio signals, wherein the spatialized audio includes sounds localized to the plurality of locations designated in the listening environment; and
continuing, by the one or more speakers, output of the spatialized audio after the display discontinues presentation of the visual representation of the plurality of audio sources.

18. The non-transitory machine readable medium of claim 17, wherein the view of the listening environment comprises frames of a video of the listening environment in which the audio system is being used, and wherein a plurality of positions on the frames of the video corresponding to the user input has a different relative direction from the one or more speakers than the plurality of locations designated in the listening environment.

19. The non-transitory machine readable medium of claim 17, wherein the plurality of sound source icons are animated representations of the audio source, and wherein the animated representations include animation parameters corresponding to sound parameters of the audio input signals.

20. The non-transitory machine readable medium of claim 17, wherein the plurality of audio sources have predetermined acoustic performances.

* * * * *